3,788,969
QUANTITATIVE ANALYZER FOR LIQUID-SOLID CHROMATOGRAPHY OR FOR ELECTROPHORESIS AND METHOD FOR ITS USE
Vittorio Di Stefano and Paolo Marini, Rome, Italy, assignors to Centro Sperimentale Metallurgico S.p.A., Rome, Italy
Filed July 26, 1971, Ser. No. 166,114
Claims priority, application Italy, Sept. 4, 1970, 53,219/70
Int. Cl. B01k 5/00
U.S. Cl. 204—299
11 Claims

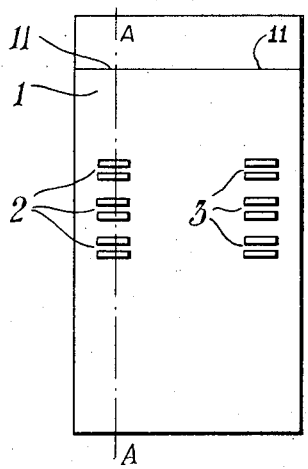
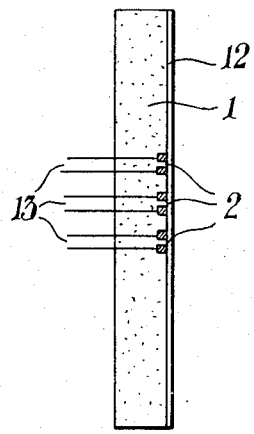
Fig. 2   Fig. 3
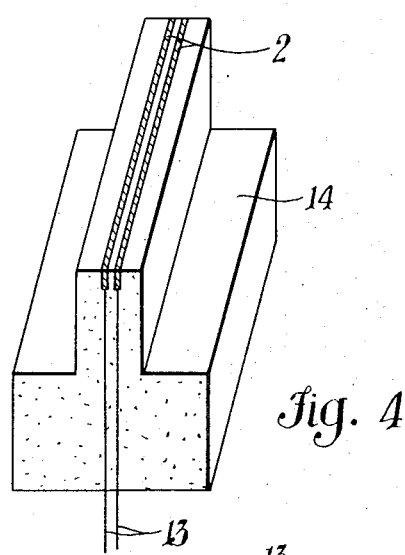
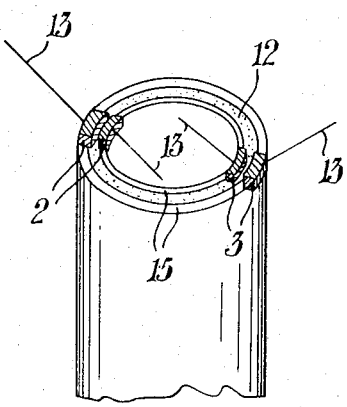
Fig. 4   Fig. 5
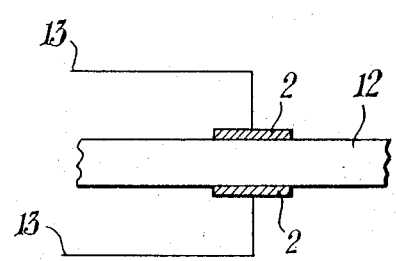
Fig. 6

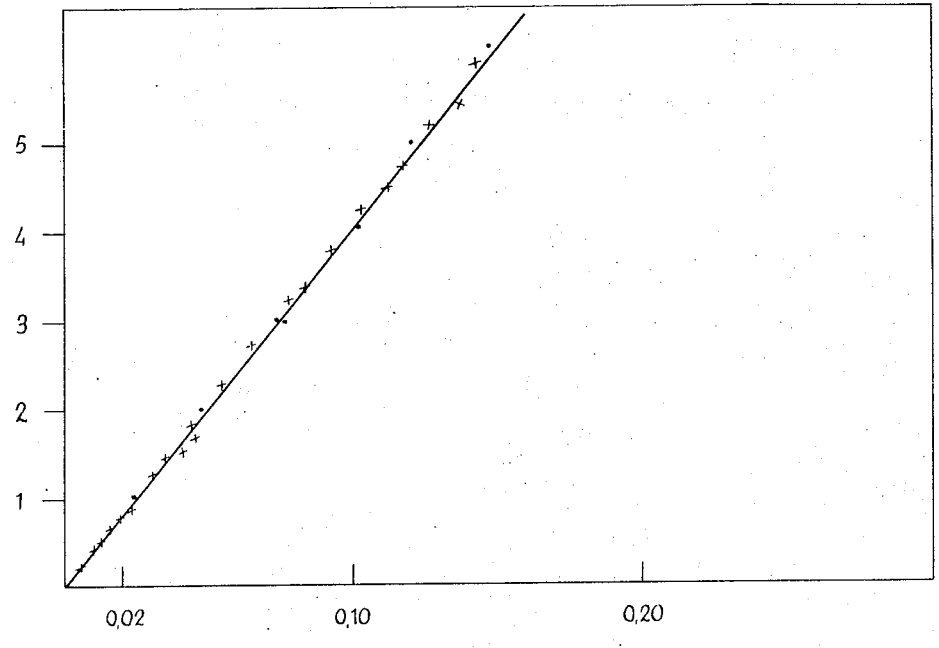
Fig. 7
Fig. 8
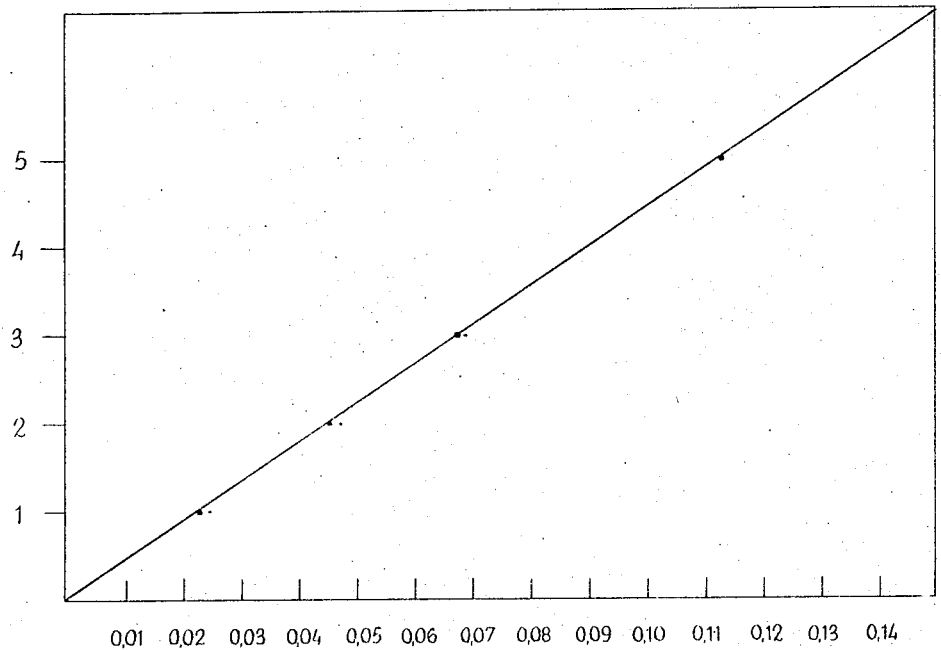

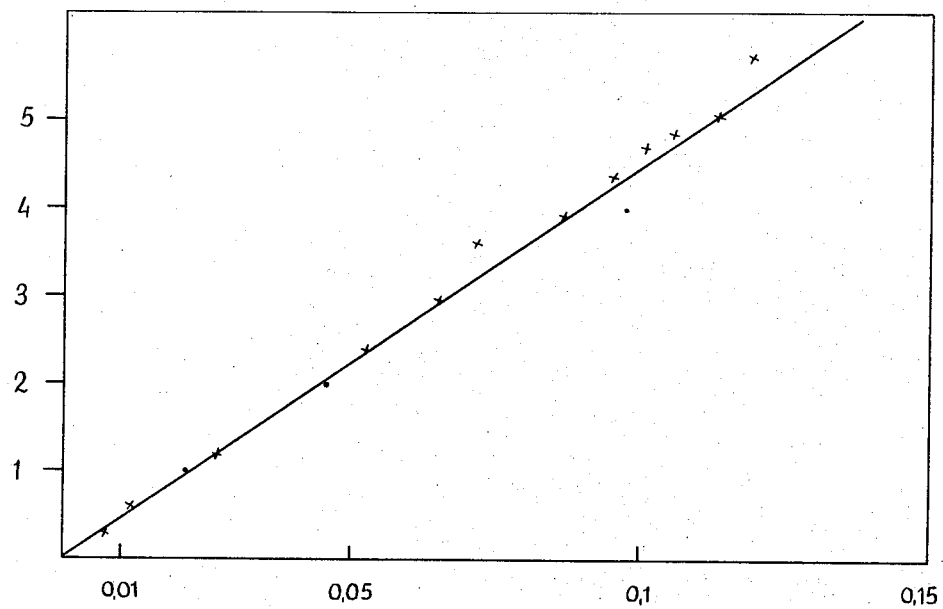
Fig. 9
Fig. 10
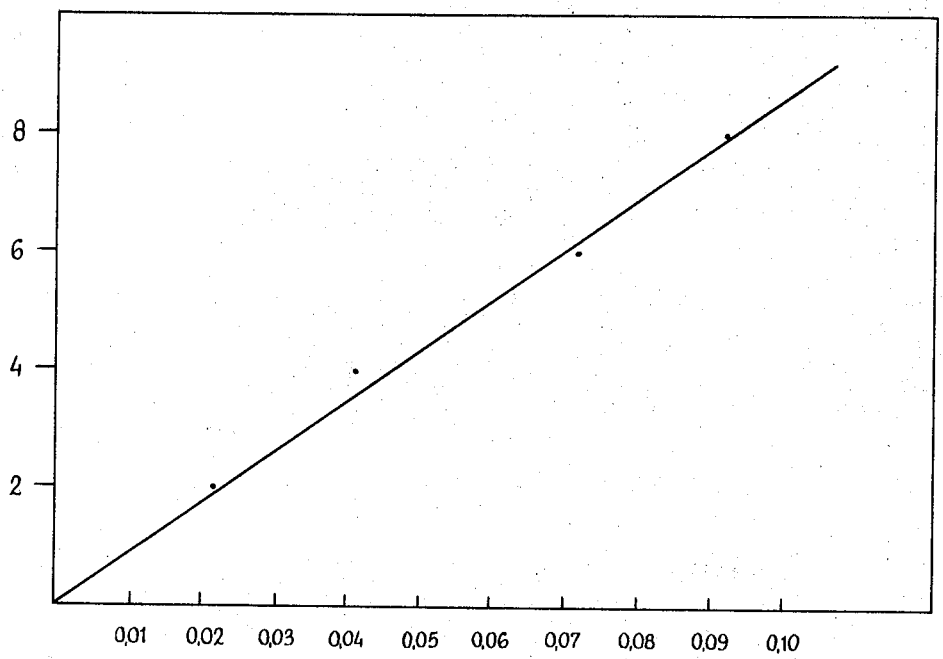

ABSTRACT OF THE DISCLOSURE

A quantitative analyzing device for liquid-solid chromatography or electrophoresis, comprising a sensitive element detecting variations of a characteristic value of the chromatographic layer-eluent-eluate system, which value is a function of the concentration of the eluate in the eluent, a rigid protecting support, where said sensitive element is inserted, and wherein the contact between said sensitive element and the chromatographic layer is effected by means of said support. Method for the quantitative determination of chemical species separated by liquid-solid chromatography or electrophoresis, wherein a flow of a liquid eluent medium, or, respectively, a potential difference, is set on a solid chromatographic layer, the flow quantity and the distribution of said eluent on said layer is stabilized, the mixture to be analyzed is introduced and the chromatographic or electrophoretic separation of the components of said mixture is allowed to occur, the quantitative determination of one of them being performed, while the elution process is in progress, by means of the measurement of the variations of a value which is a function of the chemical species concentration in the eluent, said measurement being performed in a limited zone of the chromatographic layer and said concentration variations of the chemical species under examination occurring because of the passage of said species in said zone of the chromatographic layer.

Figure 1:
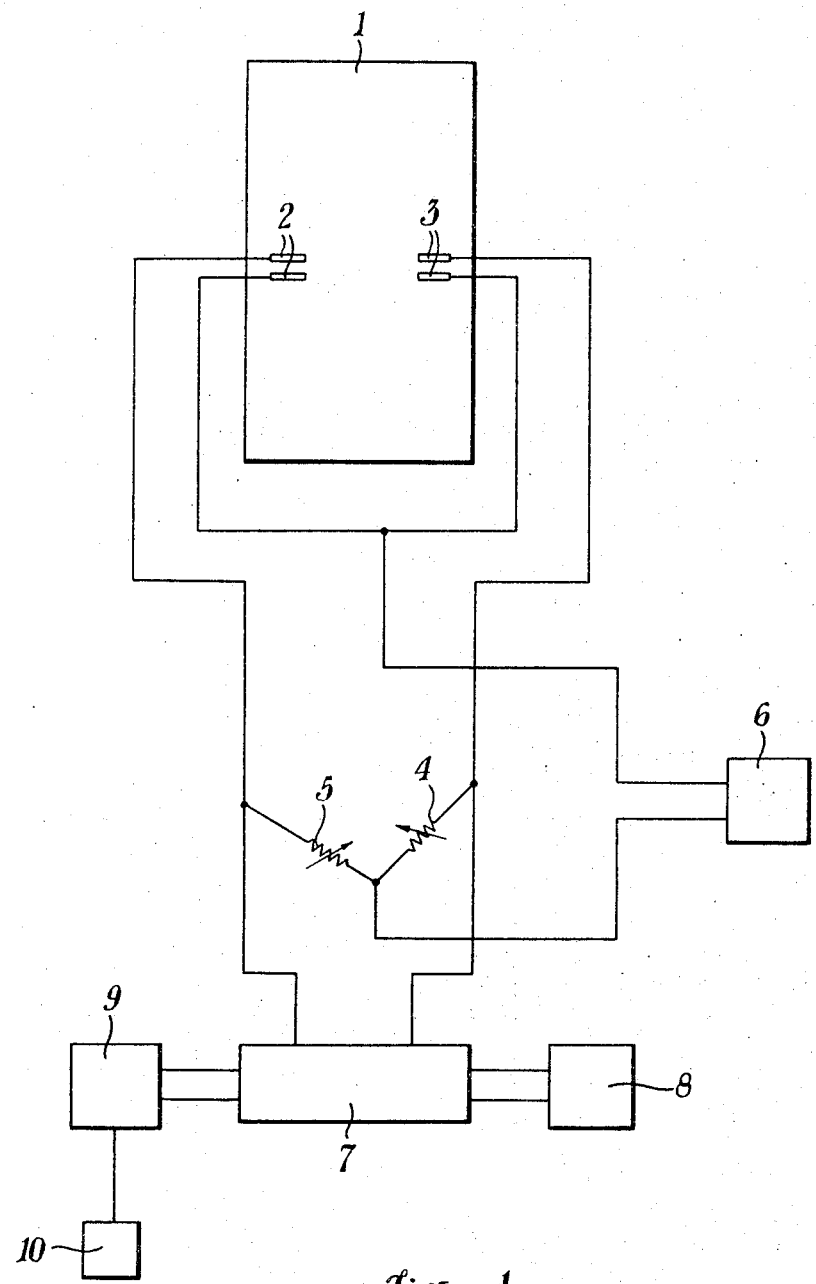

The present invention concerns a quantitative analyzer for liquid-solid chromatography or for electrophoresis and the method for its use.

In particular the object of the invention is an analyzer for rapid and accurate quantitative determination of chemical species constituting a mixture, separated by the known techniques of liquid-solid chromatography or of electrophoresis, and the method for its use.

It is known that, for many industries, the control of the chemical species present in their products is important, and it is also known that liquid-solid chromatography and electrophoresis are the best separation methods for many types of mixtures; on the other side a reliable quantitative analysis of chemical species separated by one of the hereinbefore indicated processes is a slow and laborious process which requires, in general, a complex equipment and a considerable operating ability. At the present stage of the technique, the methods and the equipment for such a type of quantitative analysis are rather at a laboratory stage than at an industrial application one; some of the more known or newer techniques, in this field, displayed the following characteristics:

(a) The chromatographic separation process is carried on to complete elution of the substances to be analyzed; the various eluate fractions, properly collected, are determined by conventional analytical techniques; this is a slow and laborious process requiring a considerable ability from the analyst, especially in the collection of badly differentiated eluate fractions and in general it does not allow to operate with sufficient precision, especially with very small quantities of substances (for example of the order of one microgram).

(b) The paper chromatogram is obtained, is dried and then diaphanized with paraffin oil or other diaphanizing agents, and finally the quantitative determination is performed by reading the optical density of the spots on a microdensitometer; this method is sufficiently simple but not rapid and is not very precise, with errors which can arrive up to 20%; one of the main causes of error is the diaphanization process which is liable to affect the optical properties of the spots.

(c) The chromatogram obtained on the paper, or on a thin layer or also by electrophoresis, is dried, developed and photographed; the negative thus obtained is read on a microdensitometer; also this method is not rapid and displays errors of the order of 10%. One of the causes of such errors is the different response of the photographic emulsion, to the various colors of the spots, another consists of the typical fog of the film which is liable to disguise or attenuate the less intense spots.

(d) The spot containing zones of a paper chromagram—or of a column, after the extraction of the chromatographic layer from the holding tube—after its development and drying, are separated, and then dissolved in a suitable solvent; the solution thus obtained is titrated by the most appropriated techniques; the process is laborious and it yields results of variable quality; this is due in part to the interaction between the materials forming the chromatographic layer and the indicator, and, in the case of paper chromatography, to the effect that the paper may have upon the titration by reacting with the reagents or with the element to be determined; typical errors are of the order of 10%.

(e) The dried paper chromatogram is introduced into an environment saturated with water vapor at 30° C., then conductivity measurements of the layer-eluate ensemble are performed, along the main axis of the paper stripe; the said measurements are performed point by point, at intervals of 1 or 2 mm.; then conductivity-distance curves are traced; the errors are greater for low concentrations and reach 15%.

From the examination of the stage of the techniques it appears that the known methods of quantitative analysis of chemical species separated by liquid-solid chromatography or by electrophoresis are generally applicable in the laboratory and they require one or more manipulation stages, intermediate between the separation process and the real quantitative analysis, and consequently, they are slow and laborious; besides, each one of the said manipulation stages is a possible source of error and of uncertainty as regards the precision of the final result. Furthermore up to now it does not exist a single analytical method which can be applied to every type of liquid-solid chromatography or to electrophoresis and which allows to obtain in every case the same intervals of precision and applicability.

Therefore it can be said that the present stage of the technique does not afford any practical device or method at the same time rapid and precise capable of allowing quantitative determinations in liquid-solid chromatography.

For the purposes of convenience and simplicity of exposition, from now liquid-solid chromatography or electrophoresis will be referred to by the term "chromatography"; the chromatographic layers (paper, column, thin layer or electrophoretic) by the expression "chromatographic layers" and the ensemble of the spots which are formed in the chromatographic layers during the separation process, by the word "chromatograms."

The object of the present invention is to provide a device and a method for its use, which allows rapid and precise determinations of the amounts of the substances under examination, while limiting the operator's intervention to the introduction of the solution to be analyzed into the chromatographic system and to sufficiently simple operations of calibration and adjustment of the equipment.

Further objects of the present invention are: to provide a device and a method for its use, suitable for an easy and rapid routine examination of samples of substances produced by industrial cycles; to obviate as much as possible the causes of error due to operator or to other agents, extraneous to the chromatographic instrument and to the device for the quantitative determination by means of elimination of all the intermediate operation between the chromatographic process and the quantitative determination, which were unavoidable until now and finally to obtain rapidly a precise answer from the quantitative analysis during the development of the process of chromatographic separation.

The method of chromatographic analysis which is the object of the present invention, consists essentially of measuring in a constant and continuous eluent flow, the variations of characteristic value of the entire chromatographic layer-eluent-eluate system, which is a function of the concentration of the chemical species which has been separated and which has to be quantitatively determined; the said variations appear in the course of time in a given section of the chromatographic layer by effect of concentration variations of said chemical species in the said eluent. The measurement of said value is performed without interruption of the separation process, directly in a zone of the chromatographic layer. Such a zone is shaped as a thin and elongated stripe, placed perpendicularly to the eluent flow direction and is located at different distances from the sampling point depending on the type of the mixture to be analyzed.

Said measurement is performed, according to the present invention, by placing in contact with the chromatographic layer in the chosen zone a sensitive element, described hereinafter, connected with a proper circuit, preferably an electronic circuit, which amplifies and registers the incoming signal.

In order to avoid the possibility that casual oscillations in the flow or in the eluant composition can eventually affect the response of the sensitive element, the measurements of the chosen value are performed in continuous opposition by means of two sensitive elements, placed into two zones mutually aligned and perpendicular to the eluent flow direction, shaped and located as described hereinbefore; the arrangement of the sensitive elements is such that the pure eluent always passes through one of them, while furthermore the spots of the eluates pass through the other element. In this way, by connecting in opposition the circuits of the two sensitive elements and by carefully balancing them, in the absence of eluate spots, a very stable zero signal is obtained, while the passage of a spot is registered with maximum sensitivity.

One of the values which can be selected for the realization of the method covered by the present invention is electrical conductivity. Said value is a linear function, within large intervals, of the conductive substance concentration and it can be used with a carefully chosen eluent, to quantitatively determine both conductive and not conductive chemical species; in fact the sensitivity of the method is inversely proportional to the square of the eluent conductivity. In particular, for example in the case of conductive chemical species, the conductivity of the eluent can be adjusted in such a manner that the resistance of the sensitive element-chromatographic layer-eluent system is included in the interval ranging from 10 to 500,000Ω, and good results are obtained in every case.

In the case of not conductive chemical species, the upper limit of the said interval may even increase considerably. However it is preferable to not exceed then 100 MΩ value.

Obviously the indicated resistance interval does not limit in any way the coverage of the present invention; in fact in the case where the hereinbefore indicated limits are exceeded, only the complexity of the electronic circuit should be changed, for example by using very high input impedance amplifiers, while both the system and the method covered by the present invention remain unchanged.

According to the present invention the method for the quantitative determination of chemical species separated by liquid-solid chromatography or by electrophoresis is characterized in that if fixed a flow of a suitable liquid eluent through a solid chromatographic layer, and then the flow and the distribution of said eluant in said chromatographic layer is stabilized; the mixture to be analyzed is then introduced into the chromatographic system; chromatographic or electrophoretic separation of the components of the said mixture is allowed to occur and, finally, while the eluation process is still maintained, the quantitative determination of the said components is performed by the measurement of the variations of a value, for example of electric conductivity, which is a function of the concentration of the chemical species in the eluent; said measurement being performed in a restricted zone of the chromatographic layer, and said variations of the concentration of the chemical species under examination being caused by the passage of the said chemical species through the said zone of the chromatographic layer.

In the case, mentioned only as a mere example, that the value selected for the measurements is electrical conductivity, said measurements are performed by putting into contact with the chromatographic stratum, in the hereinbefore repeatedly mentioned zone, a sensitive element functioning as a conductivity cell, essentially consisting of two couples of electrodes, one of which, having a reference function, is crossed only by the pure eluant, while the other is crossed also by the separated chemical species, and has the function of a measuring element. Said sensitive elements, their arrangement in the chromatographic stratum, their connection with the measuring electronic circuit will be described here in the following.

Further, the object of the present invention is to provide a device suitable for the realization of the method hereinbefore described.

Said device consists essentially of a sensitive element capable of signaling the variations of a suitable characteristic value of the chromatographic layer-eluent-eluate system, which value is a function of the concentration of the eluate in the eluent; this element is inserted into a rigid support protecting its integrity and, according to the present invention, allowing to put said sensitive element into contact with the chromatographic layer in which occurs the separation process of the chemical species to be analyzed. The contact of said sensitive element with said chromatographic layer is realized by placing the sensitive element itself on one or on both the faces of said layer or within the layer itself, selecting for the contact a suitable zone of said layer, shaped as a thin, elongated strip, transversal to the eluent flow direction. The support of the said sensitive element can be the support of the chromatographic layer itself or a separated support; in this latter case the support is removable from said layer and moveable on it, in order to be placed, for each type of separation, at the best distance from the point of introduction of the mixture.

In the case, mentioned only as a mere example and implying no limitations, when the selected value is electric conductivity, the device, according to the present invention, consists of a conductivity microcell, where the sensitive element comprises two couples of electrodes made of a conductive material, chemically inert in respect to the substances with which it has to come in contact, and shaped as a wire, a thin lamina or as a comb, or in any other way suitable for the desired objective, said cell being elongated in shape and placed in contact with the chromatographic layer in one of the hereinbefore described arrangements and in a position perpendicular to the eluent flow.

Said two couples of electrodes are placed in contact with the chromatographic layer in such a manner that one is crossed only by the eluent, while the other is crossed also by the chemical species separated by the chromatographic process, and they are connected between them in opposition by means of a suitable circuit, for example by a bridge of Thompson type, said circuit being balanced in such a manner that the signals originating from the two electrodes couples cancel each other in the absence of eluate spots. In this way the casual oscillations of the flow or of the eluent composition are prevented from eventually affecting the response of the sensitive element; a very stable zero line is obtained and the passage of the chromatographic spots is signaled with maximum sensitivity. Said bridge circuit is then connected with an electronic circuit capable of amplifying the signal originated by the device, forming the object of the present invention, and of recording the resulting peaks diagram.

For the purposes of exemplification and not as a limitation, and with reference to the attached drawings, herein the following are illustrated some realizations of the device forming the object of the present invention.

In the drawings:

FIG. 1 represents the general layout of the entire equipment,

FIG. 2 represents the analyzing device according to the invention for thin layer chromatographic separations, FIG. 3 shows the A—A cross section of FIG. 1, FIG. 4 shows the analyzing device according to the invention, with the electrode support separated from that of the chromatographic layer, FIG. 5 represents the analyzer according to the invention for column chromatography, FIG. 6 is a section view of the analyzer device according to the invention with the electrodes in contact with the two chromatographic faces, FIGS. 7-10 are diagrams illustrating the calibration curves obtained by elution of some metallic ions.

A particular reference is now made to each drawing.

In FIG. 1, 1 indicates the support of the chromatographic layer; 2, the measuring electrode couple; 3, the reference couple, connected with two variable resistances 4 and 5 intended to balance the bridge consisting of the electrodes of couples 2 and 3 and of the said variable resistances 4 and 5. Said bridge is fed by an oscillator 6 with an oscillating frequency ranging from 1 to 10 kHz. and its output signal is sent to a differential amplifier, connected with a recorder 8 and eventually with an integrator 9 and with a printer 10.

In FIG. 2, 1 indicates the chromatographic layer support, usually made of glass or of some other rigid, electrically nonconductive material, which also is the support of the microcells 2 and 3, which are connected with the amplifying and recording circuit by couples 2 and 3 located at the same distance as the sampling points 11, where the substance is inserted.

The electrodes are housed inside hollows created within support 1 in such a manner that they do not protrude from the surface of the said support 1 while the surface remains flush. FIG. 3 shows the support 1 of electrodes 2 and the terminals 13 connecting them with the circuit and with the thin layer 12.

FIG. 4 shows a single couple of electrodes 2 housed inside grooves made within the support 14, made of an electrically nonconductive material, and provided with the circuit connecting terminals 13. A couple of said devices, rigidly aligned, can be put into contact with the chromatographic layer, paper or thin layer, in positions similar to those indicated n FIG. 2 for the electrodes couples 2-3; said couple of device is moveable on the chromatic layer surface, for the purposes of selecting the best position for any type of analysis.

As shown in FIG. 5, in order to have the electrodes of a single couple 2 or 3 facing each other the support of said electrodes and of the chromatographic layer 12 is shaped as an annular, hollow-in-the-center column 15, with the space between its external and internal walls filled wtih the chromatographic layer 12, 13 indicates the terminals connecting the electrodes with the circuit.

FIG. 6 shows a single couple of electrodes 2, with their terminals 13 and a portion of the chromatographic layer 12. The electrodes are kept in contact with the stratum by any device not shown in the drawings.

The device which is the subject of the present invention and the method for its use allow very accurate and, above all, rapid determinations, as indicated by the attached diagrams (FIGS. 7–10), showing the calibration curves obtained by elution of some metallic ions.

As shown in the drawings the curves are rigorously linear and the errors are minimal. In these diagrams the areas of the peaks obtained are indicated on the abscissae and the quantities of the substances, expressed in millionths of a g. are indicated in the ordinates.

In particular:

FIG. 7 shows the calibration curve for the $Zn^{2+}$ ion
FIG. 8 shows the calibration curve for the $Mn^{2+}$ ion
FIG. 9 shows the calibration curve for the $Fe^{3+}$ ion
FIG. 10 shows the calibration curve for the $Co^{2+}$ ion The present invention has been described with particular reference to specific forms of realization thereof, but it is intended that in practice, modifications and variations may be introduced therein, without infringing the protection limit of the present industrial patent.

Having thus described the present invention, what is claimed is:

1. Quantitative analyzing device for liquid-solid chromatography or electrophoresis, characterized in that it comprises a sensitive element detecting variations of a characteristic value of the chromatographic layer-eluent-eluate system, which value is a function of the concentration of the eluate in the eluent, a rigid protecting support, where said sensitive element is inserted, and wherein the contact between said sensitive element and the chromatographic layer is effected by means of said support.

2. Analyzing device according to claim 1, characterized in that the contact of the sensitive element with the chromatographic layer occurs either on one or on both faces of the layer, or within the stratum itself, along a thin strip-like elongated zone, transversal to the eluant flow direction.

3. Analyzing device, according to claim 1 characterized in that the support of said sensitive element is the same as that of the chromatographic layer.

4. Analyzing device according to claim 1, characterized in that the support of the sensitive element is movable along the chromatographic layer and is removable therefrom.

5. Analyzing device according to claim 1, consisting of a microcell, characterized in that said sensitive element comprises two couples of electrodes made of conductive, chemically inert material, shaped as a wire, a thin lamina or as a comb, and wherein said cell is placed into contact with the chromatographic layer, perpendicular to the eluent flow, and wherein conductivity is the value selected for the measurement.

6. Analyzing device according to claim 5, characterized in that one of the two electrodes couples into contact with the chromatgraphic layer is crossed by the pure eluent and the other couple is crossed also by the chemical species separated by the chromatographic process, and wherein the said couples are connected in opposition between them by means of a circuit balanced in such a way as to nullify, in the absence of eluate spots, the signals originating from said two electrodes couples, and wherein said circuit is connected in turn with an amplifying-recording device.

7. Analyzing device according to claim 6, characterized in that said circuit is a bridge of Thompson type and said amplifying-recording device is an electronic circuit which amplifies the signal originating from said analyzing device, and records the resulting peaks diagram.

8. Analyzing device according to claim 7, characterized in that said measuring circuit or bridge consists of said two electrodes couples connected by two balancing variable resistances and is fed by an oscillator with an oscillation frequency ranging from 1 to 10 kHz., and wherein the signal output therefrom, is sent to a differential amplifier connected with a recorder and eventually an integrator and a printer.

9. Analyzing device for thin layer chromatography, according to claim 8, characterized in that said two electrodes couples, one for measurement and the other for reference, are supported by the same support of the chromatographic stratum, made of glass or of some other rigid, not conductive material and connected in couples with the amplifying-recording electronic circuit, and wherein said couples are located at the same distance from the sampling points and the electrodes are housed inside grooves made within said support, without protruding from its surface.

10. Analyzing device according to claim 8, characterized in that said two electrodes couples are placed in a conductive support separated from the support of the chromatographic stratum, and are housed inside grooves made in said separate support, provided with terminals for its connection with the circuit, and wherein said couples are movable on the chromatographic stratum surface.

11. Analyzing device for column chromatographic separation according to claim 8, characterized in that said two electrodes couples are housed in the walls of the support of the chromatographic layer, said support being shaped in form of an annular column hollow in the center, and in which the space between the internal and external walls of the column is filled with the chromatographic layer.

References Cited
UNITED STATES PATENTS

| | | | |
|---|---|---|---|
| 3,375,187 | 3/1968 | Buchler | 204—301 |
| 3,453,200 | 7/1969 | Allington | 204—301 |
| 3,594,294 | 7/1971 | Pretorius et al. | 204—180 G |
| 3,616,454 | 10/1971 | Levy et al. | 204—299 |
| 3,640,813 | 2/1972 | Nernberg | 204—299 |
| 3,649,498 | 3/1972 | Pretorius et al. | 204—180 G |
| 3,697,406 | 10/1972 | Svendsen | 204—299 |

JOHN H. MACK, Primary Examiner

A. C. PRESCOTT, Assistant Examiner

U.S. Cl. X.R.

204—180 G